United States Patent
Chiang et al.

(10) Patent No.: US 7,561,585 B2
(45) Date of Patent: Jul. 14, 2009

(54) MANUFACTURE AND METHOD FOR ACCELERATING NETWORK ADDRESS TRANSLATION

(75) Inventors: Ming-Jun Chiang, Taipei (TW); Chih-Chieh Chuang, Kaohsiung (TW); Chun-Yu Chen, Kaohsiung (TW); Chun-Nan Li, Chiai (TW); Ishemel Chang, Changhua (TW)

(73) Assignee: Nuvoton Technology Corporation, Hsinchu (TW)

( * ) Notice: Subject to any disclaimer, the term of this patent is extended or adjusted under 35 U.S.C. 154(b) by 967 days.

(21) Appl. No.: 10/249,310

(22) Filed: Mar. 31, 2003

(65) Prior Publication Data

US 2004/0081150 A1    Apr. 29, 2004

(30) Foreign Application Priority Data

Oct. 23, 2002    (TW) ............................... 91124464 A (51) Int. Cl.
*H04L 12/28* (2006.01)
*H04L 12/56* (2006.01)
(52) U.S. Cl. ..................................................... 370/401
(58) Field of Classification Search ................ 370/389, 370/392, 400, 401, 402

See application file for complete search history.

(56) References Cited

U.S. PATENT DOCUMENTS

| 6,292,489 | B1 * | 9/2001 | Fukushima et al. | 370/401 |
|---|---|---|---|---|
| 6,829,239 | B1 * | 12/2004 | Bhatia et al. | 370/392 |
| 6,985,440 | B1 * | 1/2006 | Albert et al. | 370/230 |
| 2002/0032855 | A1 * | 3/2002 | Neves et al. | 713/154 |
| 2002/0161915 | A1 * | 10/2002 | Crow et al. | 709/236 |
| 2003/0093563 | A1 * | 5/2003 | Young et al. | 709/245 |
| 2006/0018308 | A1 * | 1/2006 | Choi et al. | 370/352 |
| 2006/0185010 | A1 * | 8/2006 | Sultan | 726/12 |
| 2006/0276209 | A1 * | 12/2006 | Neves et al. | 455/466 |
| 2008/0056253 | A1 * | 3/2008 | Minami et al. | 370/389 |

* cited by examiner

*Primary Examiner*—Ajit Patel
(74) *Attorney, Agent, or Firm*—Jiang Chyun IP Office (57) ABSTRACT

The speed of the network address translation translated with software is generally slower than the speed of transmitting packet in the network, so that the data stored in memory is affected. In this invention, the network address translation is translated by hardware, and a plurality of comparing engines is employed to accelerate the translating speed. Therefore, even in the worst case scenario, the time needed for translating the network address is shorter than the time needed for storing the packet into memory, so that the operation of the network address translation is assured not to affect the data transmission in the network.

15 Claims, 7 Drawing Sheets

MANUFACTURE AND METHOD FOR ACCELERATING NETWORK ADDRESS TRANSLATION

CROSS REFERENCE TO RELATED APPLICATIONS

This application claims the priority benefit of Taiwan application serial no. 91124464, filed Oct. 23, 2002.

BACKGROUND OF INVENTION

1. Field of Invention

The present invention generally relates to a network address translation, and more particularly, to a method for accelerating the network address translation by processing the packet header.

2. Description of Related Art

The use of the Internet is growing more and more popular now; almost everyone experiences searching for information on the Internet, using e-mail to send/receive messages, and playing on-line games on network. With this situation of increased demand of using the Internet, multiple users in a family or at a company frequently want to access the Internet at the same time. The general Internet Service Provider (ISP), e.g. Hinet, provides only one IP (Internet Protocol) address; with this IP address, only one computer can connect to Internet. One IP address is limited to being used by only one computer at a time because the packet is sent to the Internet with this IP address, and the reply packet is also sent back by recognizing this IP address. If one IP address is used by two or more computers, the reply packet cannot determine which computer it should reply to. This, in turn, causes a big problem. Therefore, in order to have multiple computers access the Internet at the same time, it becomes necessary to request multiple IP addresses from the ISP. However, using the Internet is very costly, especially for the large organization that provides for hundreds or even thousands of employees. In such cases, the cost of using the Internet becomes a great burden. The problem worsens under the current scenario of the IP address of the Internet protocol currently used not being adequate to provide for the enormous growth of demands.

Figure 1:
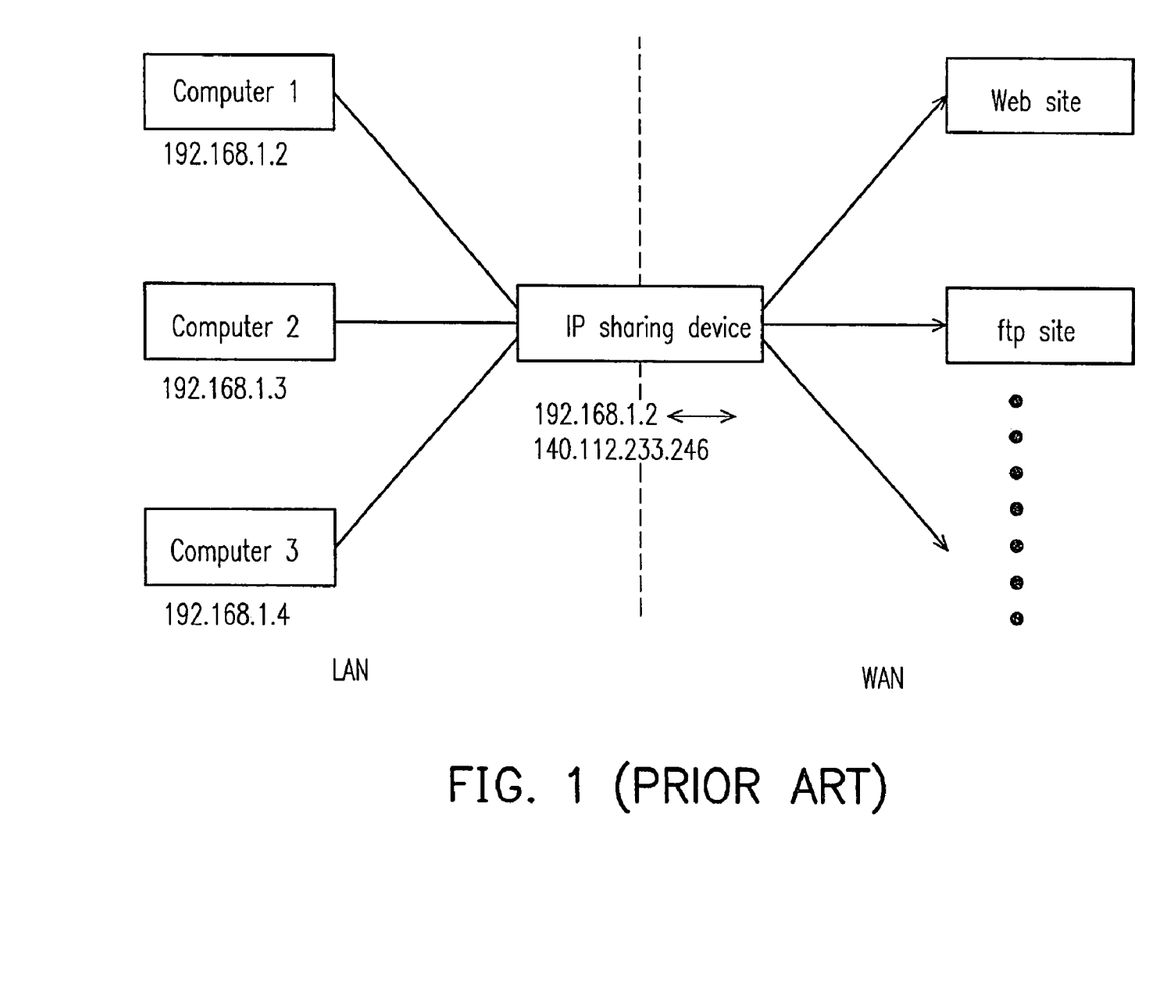
FIG. 1 is a diagram schematically showing a connection of LAN and WAN via an IP sharing device.

Several computers in the home or multiple internal computers at an office can communicate to external network via the same address by using an IP sharing device. Here the applicable principle is: the several computers in the home or the multiple internal computers at an office respectively form a Local Area Network (LAN) and communicate to the external Wide Area Network (WAN) via an IP sharing device. Referring to FIG. 1, the IP address (e.g. 140.112.233.246 shown in FIG. 1) provided by the Internet Service Provider (ISP) points to the IP sharing device, any packet transmitted to the IP address provided by the ISP is sent to the IP sharing device first, so that the packet is determined and transmitted to the computer inside the LAN that needs it. Each computer inside the LAN has its own private IP address, such as 192.168.1.2~4 as shown in FIG. 1; these addresses are provided by the IP sharing device and can be used only inside this LAN. When any computer inside the LAN sends out one packet to the WAN, the packet is transmitted to outside via the IP sharing device. The source related data such as the virtual IP address recorded in packet is replaced by the IP address provided by the ISP by the IP sharing device since the virtual IP address used in the LAN cannot be recognized in the WAN. For example, the virtual IP address 192.168.1.2 inside the packet of the first computer shown in FIG. 1 is converted to the IP address 140.112.233.246 provided by the ISP, and the IP sharing device also records the information of which computer sends out this packet. Therefore, it is determined that such packet is sent out from the address owned by the IP sharing device. When the external WAN sends back the packet, the packet is also sent back to the IP sharing device. The packet can be appropriately sent back to the particular computer that needs this packet data with the information previously recorded by the IP sharing device. With such a conversion process, multiple computers can use the same address. Further, the internal data are also protected with this conversion process so that the network security is improved. Three segments are defined as the private IP address segment, they are respectively: 10.0.0.0 10.255.255.255, 172.16.0.0 172.31.255.255, and 192.168.0.0 192.168.255.255.

Multiple computers can communicate to the external network via the same IP address provided by the ISP. The IP sharing device currently used processes the mapping and conversion of the virtual IP address as well as the WAN IP address provided by the ISP. Relatively speaking, since the conversion speed in not fast enough, the transmitted packet data occasionally has to wait for the completion of the network address translation of the IP sharing device. Therefore, the network address translation in the prior art is processed by the hardware according to the present invention, and the method for translating the network address is also improved, so that the data transmission are not delayed due to the problem of the network address translation.

SUMMARY OF INVENTION

Since the network address translation in the prior art is processed by software, it may cause data transmission delay due to the fact that the speed of the network address translation is slower than the speed of the data transmission in network when a great amount of data needs to be transmitted. The major objective of the present invention is to provide a network address translation accelerator with which the header data of multiple packets can be divided into a plurality of portions and can be processed simultaneously, so that the processing can be accelerated and the time needed for processing packets is assured to be shorter than the time needed for transmitting it. Therefore, it can effectively avoid the transmission delay caused by the network address translation.

The other objective of the present invention is to provide a network address translation accelerator, and with a new method for translating the network address, the area and size of corresponding codes for the network address translation can be reduced and the processing can be accelerated.

In order to achieve the objectives mentioned above, a network address accelerator is provided by the present invention. The present invention applies the network address translation accelerator to divide the data that need to be processed by the translation into several portions and processes them simultaneously, so that the processing time is reduced and the performance is optimized for improving the processing performance. A new method for translating the network address is also applied to reduce the area and size of the corresponding codes, so that the processing can be accelerated and the time needed for processing packets is assured to be shorter than the time needed for transmitting it. Therefore, it can effectively avoid the transmission delay caused by the network address translation.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DETAILED DESCRIPTION

Multiple embodiments are described in detail hereinafter. However, besides the detailed description below, the present invention also can be applied to other embodiments for its implementation. Accordingly, the scope of the invention will be defined by the attached claims not by the above detailed description.

Figure 2:
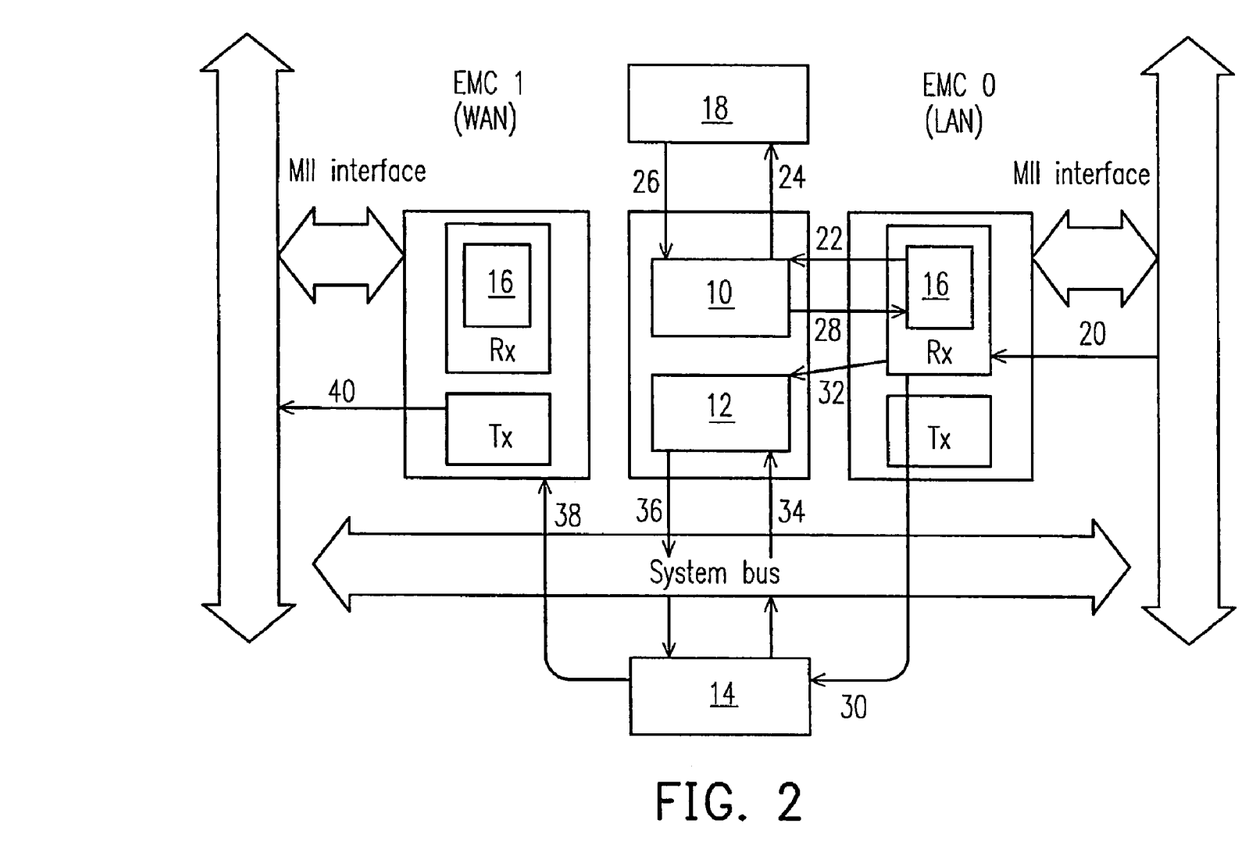
FIG. 2 schematically shows a flow chart of the operation of the network address translation accelerator of a preferred embodiment according to the present invention.

The flow chart of a preferred embodiment of the present invention is shown in FIG. 2, it shows the flows when a packet is transmitted from LAN to WAN. The network address translation accelerator of the present invention comprises a comparing engine 10 and a replacing engine 12. The detail operation is described in detail hereinafter.

When the packet is transmitted from WAN to LAN or from LAN to WAN, as shown in step 20, the packet is transmitted to a receiving engine Rx via a media independent interface (MII). The packet contains a small segment of the data intended to be transmitted and a message of the source and destination information required by the communication protocol. The packet data are divided into a portion of the data intended to be transmitted and a portion of the message of the source and destination information by a syntax parsing engine 16. Here, the data intended to be transmitted are sent to the memory 14 and temporarily stored in it in step 30. The message of the source and destination information is sent to the comparing engine 10 in step 22. The comparing engine 10 queries against a network address translation table in step 24, the query result is subsequently sent back to the comparing engine 10 in step 26. The comparing engine 10 further sends the query result to the syntax parsing engine 16 in step 28, so that the syntax parsing engine 16 can determine to which packet the queried data belonged to, and whether the data should be transmitted or blocked. The packet and descriptor data are stored into the memory 14 by the receiving engine Rx in step 30. If it is determined that the replacement is required after querying the network address translation table 18, the replacing engine 12 is activated in step 32. Then, the replacing engine 12 reads out the packet data part of the data stored in the memory 14 needing to be replaced via the system bus in step 34, replaces it and writes it back to the memory 14 via the system bus in step 36. The replaced packet data are sent to the transmitting engine Tx and wait for transmitting in step 38. The packet data are further sent out via the MII interface in step 40. Some steps mentioned above can be performed simultaneously, for example, step 22, 24 and 26 can be processed simultaneously with step 30.

The network address translation table in prior art comprises three portions: first, a masquerading information; second, a private information; and third, a public information. Most data currently transmitted in network use Internet Protocol (IP) communication protocol for its transmission. The network address translation table of the present invention comprises two portions: one is a masquerading information, and the other one is a private information, wherein the public information is excluded from it. Therefore, the size of the network address translation table is reduced by ⅓, so that the time needed for the querying process is reduced and the performance of the network address translation query is improved accordingly. Since the public information portion is excluded, when the reply packet is not sent back from the original destination to which the packet delivers it, e.g., when someone fakes a packet whose destination is one of our real network IP addresses, the hardware may misrecognize it and accept it due to the lack of the public information for comparison. Therefore, additional software is used to organize the masquerading information portion according to the destination port of the packet that is to be transmitted to the WAN, so that the source port of the reply packet will not be sent to the wrong port due to the sequence of the masquerading information not being matched. Therefore, the problem of receiving an incorrect packet that can adversely affect network security can be avoided.

Figure 3:
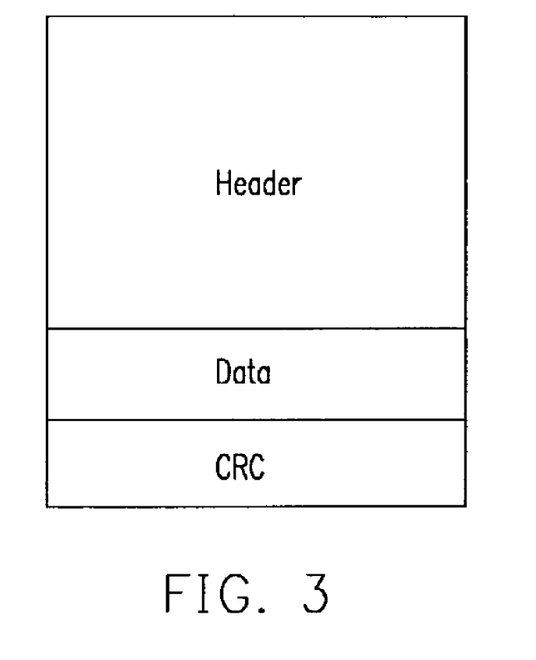
FIG. 3 schematically shows a simple diagram for a data structure of all data contained in the packet.

In the network address translation accelerator, the time for querying the network address translation table must be shorter than the time for storing the packet, so that the packet storing process is not affected. In other words, the process of a packet transmission, the network address translation, and the syntax paring, which includes step 22, 24, 26 and 28, must be completed before the storing process of step 30 is finished. FIG. 3 schematically shows a worst case scenario of a packet that comprises a header, a 16 bits data, and a CRC. The data length of the header portion is 60 bytes, and T bytes of data are transmitted per cycle internally (i.e. per internal cycle of the bus), thus a time of 60/T cycles is required. The data transmission rate of the data and CRC specified by the MII is a trans mission rate of ½ byte per cycle (wherein the MII data transmission rate is 100 Mbits, and the operating frequency is 25 MHz, so each cycle can transmit 4 bit, e.g. ½ byte). In such case (i.e. the worst case scenario), the data length is 2 bytes (16 bits) and the CRC length is 4 bytes (32 bits), so (2+4) .times.2 are needed, that is, a total of 12 cycles is required. The frequency inside the bus and MII is different, assuming that a time ratio needed for the MII versus one cycle inside the bus is F, thus 12 MII cycle time is equal to the 12*F internal cycle time of the bus. Therefore, 60/T+12*F internal cycles of the bus are required to transmit the packet.

The comparing engine has to query P ports simultaneously, i.e., it takes P cycles of time, if meanwhile the comparing engine is requested to read/write, then one more cycle of time has to be spent at the same time. Therefore, the worst case scenario for querying entry in the network address translation table takes P+1 cycles of time. If there are a total of E entries in the network address translation table, E*(P+1) cycles of time are required. Moreover, P more cycles of time are required for processing P ports at the same time, and thus the total query process takes E*(P+1)+P. Assuming W comparing engines are required for running the process at the same time, the total comparing process takes [E*(P+1)+P]/W. Meanwhile, following equation must be satisfied:

$$[E*(P+1)+P]/W < 60/T + 12*F \quad (1)$$

Assuming E is 16, F is 75/25=3, P is 2, and T is 4 (each time transmits one word, i.e. 4 bytes), thus W>0.98, meaning that one comparing engine is required. If there are 64 entries and 4 comparing engines are used, each comparing engine can process 16 entries, so that the time for querying the network address translation table is assured to be shorter than the time for storing the packet. Therefore, more comparing engines can be used for processing various requirements in different design environments, so that the time for querying the network address translation table is assured to be shorter than the time for storing the packet and the packet storing process is not affected.

Figure 4:
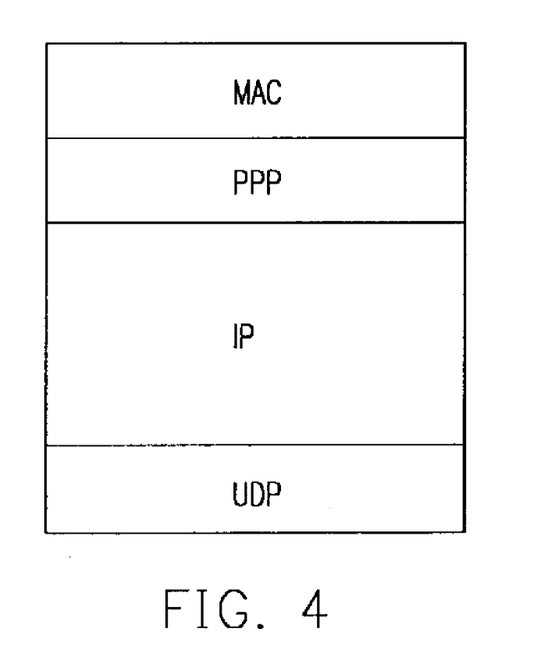
FIG. 4 schematically shows a simple diagram for a header structure of the packet.

Referring to FIG. 4, the header comprises four major parts, they are MAC, PPP, IP and UDP. MAC represents an Ethernet Media Access Control header, PPP represents a Point-to-Point Protocol on Ethernet (PPPoE) header and a Point-to-Point Protocol (PPP), IP represents an Internet Protocol (IP) header, and UDP represents a User Datagram Protocol (UDP) header. The transmitting engine Tx can be adjusted to equip the functions of deleting and adding in step 40, so that when the packet is transmitted between the Ethernet and PPP areas, the PPPoE header on the Ethernet can be deleted or added. After the first 12 bytes are transmitted, i.e. after the source MAC address and destination MAC address are transmitted, the Ethernet type field is modified and 7 bytes of data (PPP8) or 8 bytes of data (PPP16) are subsequently added or deleted.

For the fragment packet, the packet header does not show the TCP/UDP header. Therefore, one signal is sent out to notify the entry comparator of the network address translation accelerator not to compare the port values.

Figure 5:
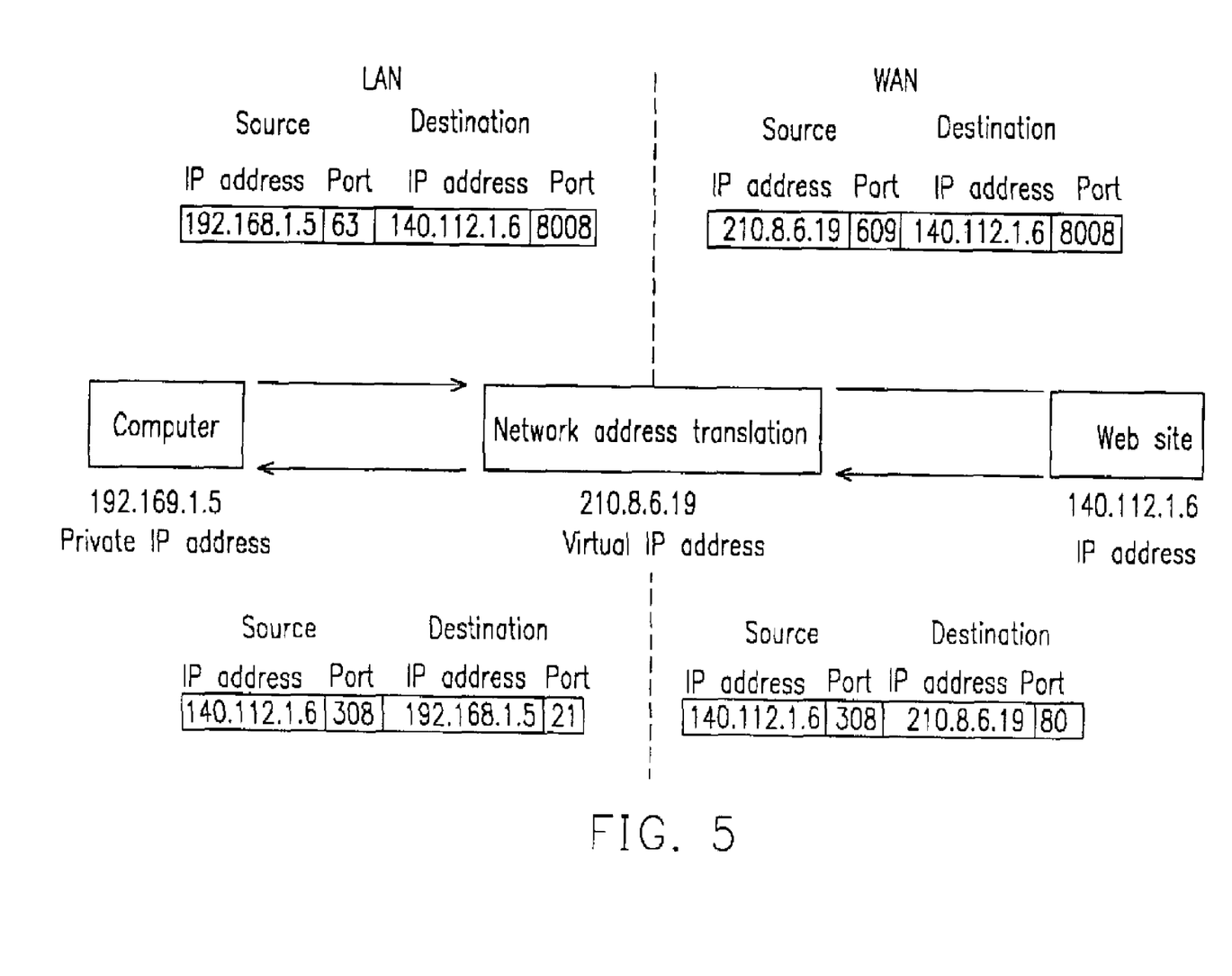
FIG. 5 schematically shows a diagram showing the source and destination IP addresses and ports of the packet after passing through the network address translation.
Figure 6:
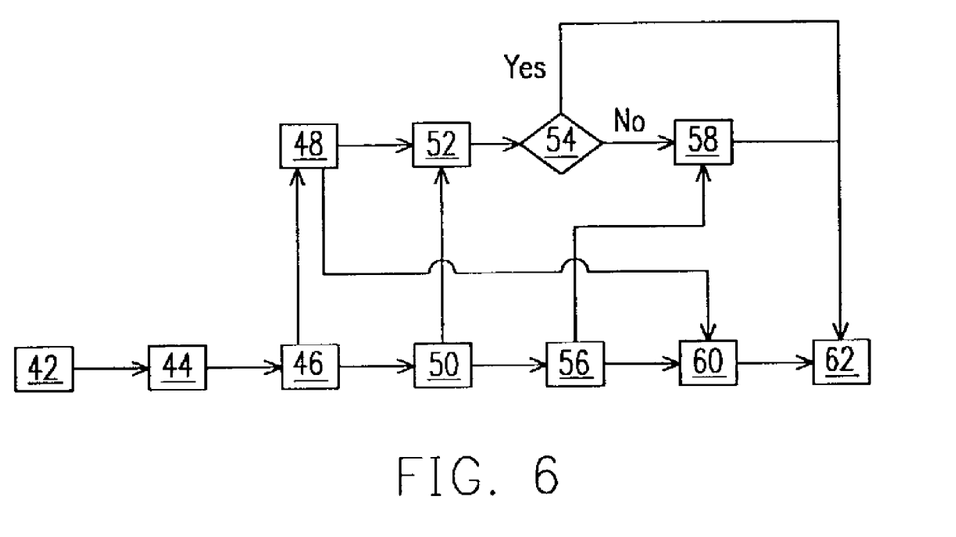
FIG. 6 schematically shows a diagram of the detail operation steps for the replacing engine.

Referring to FIG. 5, when a packet is transmitted from LAN to WAN, the data of the source IP address and port should be converted from the data of the private IP address and port into the data of the virtual IP address and port by the replacing engine, so that the WAN can determine the source of the packet. When a packet is transmitted from WAN to LAN, the data of the destination IP address and port should be converted from the data of the virtual IP address and port into the data of the private IP address and port by the replacing engine, so that the LAN can appropriately transmit the packet to the internal computer. Please refer to FIG. 6 for the detail operation flows of step 34 and 36 for the replacing engine. Block 42 represents the replacing engine starting to operate, it takes two cycles of time to obtain the information of the descriptor address and the start bit. Block 44 represents reading the information of the packet data address, and it takes one cycle of time. Then, block 46 reads the information from the read descriptor according to the read descriptor address obtained in block 42. Wherein, the information comprises: (1) a length of the IP header, it is 4 bytes; (2) a TCP/UDP header, it is 1 byte; (3) a hit entry number, wherein 5 bytes can be used herein for describing 32 entries; (4) a direction of comparator, it is 1 bit; and (5) a TCP configuration, it is 1 bit and it takes one cycle of time to process it. Block 48 fetches the entry information from the SRAM, the time needed for relating to the SRAM usually takes from 2 to 4 cycles of time. Block 50 reads the IP checksum contained in the packet information, and it takes 1 cycle of time. Block 52 recalculates the IP checksum, and it takes two cycles of time. Block 54 determines whether the UDP checksum is zero or not, if it is, the calculation of TCP/UDP (block 58) is bypassed and the process is directly entering into block 62, otherwise, it proceeds to block 58. Block 56 reads the IP checksum contained in the packet information, and it takes 1 cycle of time. Block 58 recalculates the TCP/UDP checksum, and it takes 3 cycles of time. Block 60 is a process of writing the data back, it comprises: (1) writing in the MAC address; (2) writing in the MAC port number address; (3) writing in the new IP address; and (4) writing in the new port number address, these take 6 cycles of time. Block 62 writes back the new IP checksum and the new TCP/UDP checksum. Therefore, the operation of translating the network address is accomplished.

Figure 7:
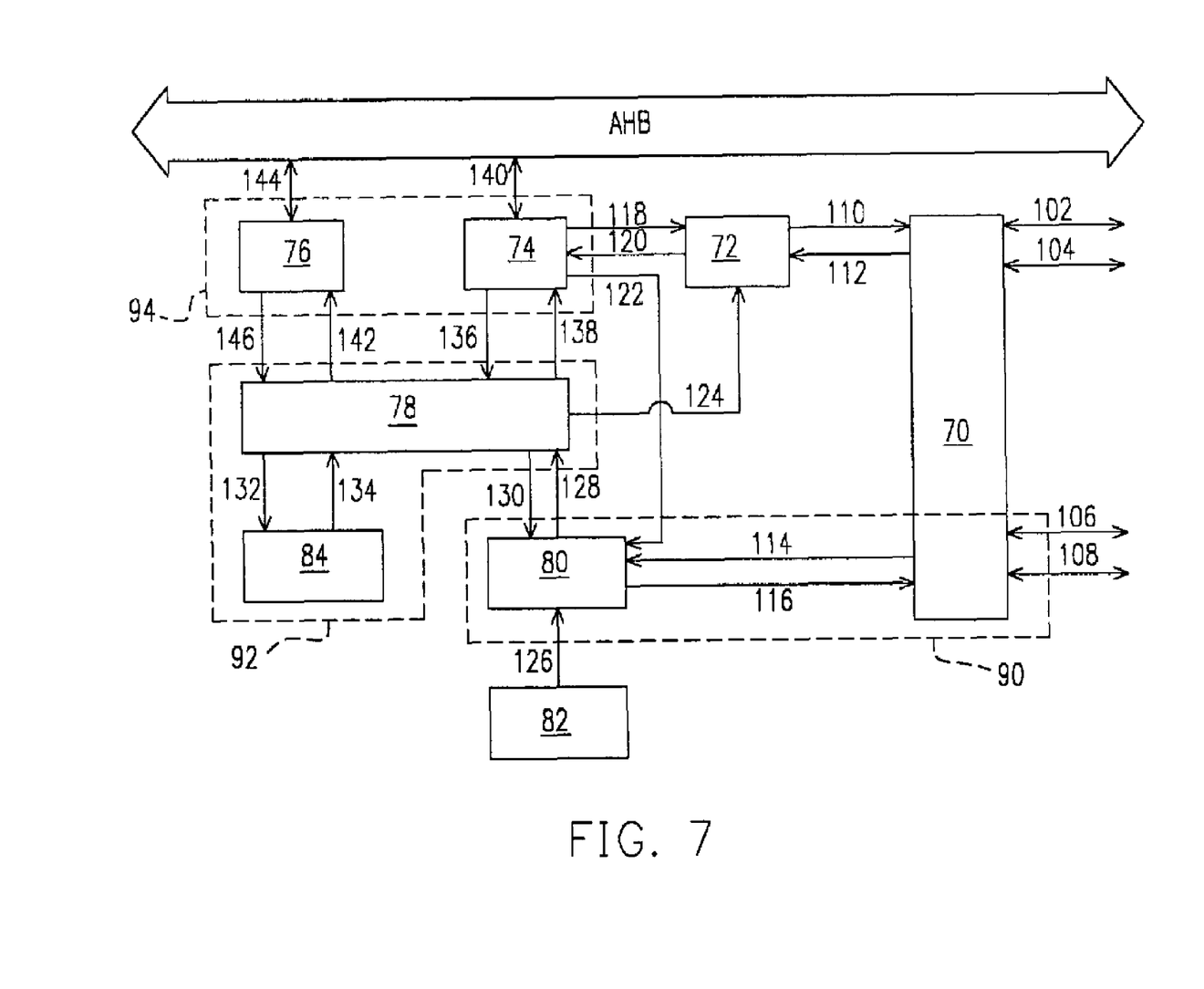
FIG. 7 schematically shows a diagram of a connection between each element of the network address translation accelerator and its communication link to the bus.

FIG. 7 schematically shows a hardware configuration diagram of each element in the network address translation accelerator. It comprises a NAT EMAC decoder 70, a NAT counter manager 72, a NAT registers 74, a direct memory access (DMA) unit 76, a finite state machine (FSM) 78, a NAT SRAM controller 80, and a NAT checksum unit 84. Wherein, AHB (advanced high-performance bus) represents a high performance bus, and the network address translation accelerator communicates with the computer via this bus. For example, the counter request 102 of signal one and the counter request 104 of signal two notify the NAT counter manager 72 to increase the counter request and the counter value via the NAT EMAC decoder 70. Moreover, the NAT counter manager 72 registers on the NAT register 74, and accepts a clear counter request 118 from the NAT register 74. Block 90 is a portion of related operations of the comparing engine, when the read request 106 of signal one and the read request 108 of signal two come in, the NAT SRAM controller 80 is notified to process a read request 114, and the NAT SRAM controller 80 sends back a read reply 116 and also receives a read data request 126 from the embedded SRAM 82. The NAT SRAM controller 80 also receives a register read/write request 122 from the NAT register 74 and performs the register read/write operation. Therefore, the NAT SRAM controller 80 uses the register read/write request 122 to build up a network address translation table, and uses the read request 114 and the read reply 116 to perform a comparison operation. Block 92 is a portion of the related operations of the replacing engine; the finite state machine 78 sends a network address translation request 128 to the NAT SRAM controller 80, and receives a network address translation reply 130 form the NAT SRAM controller 80. Moreover, the finite state machine 78 also sends a checksum calculation request 132 to the NAT checksum unit 84; the NAT checksum unit 84 replies a checksum calculation reply 134 to the finite state machine 78, and the finite state machine 78 sends a reduce calculation request 124 to the NAT counter manager 72. Block 94 is a portion of the related operations of the memory; the NAT register 74 sends a register setup instruction 136 to the finite state machine 78, and receives a setup interrupt status registry 138 from the finite state machine 78. The NAT register 74 also communicates with external system (e.g. PC) via a bus reply signal 140. The DMA unit 76 receives a control signal 142 that drives the bus from the finite state machine 78, sends back a reply signal 146 to the finite state machine 78, and also communicates with external system via a bus reply signal 144.

Figure 8:
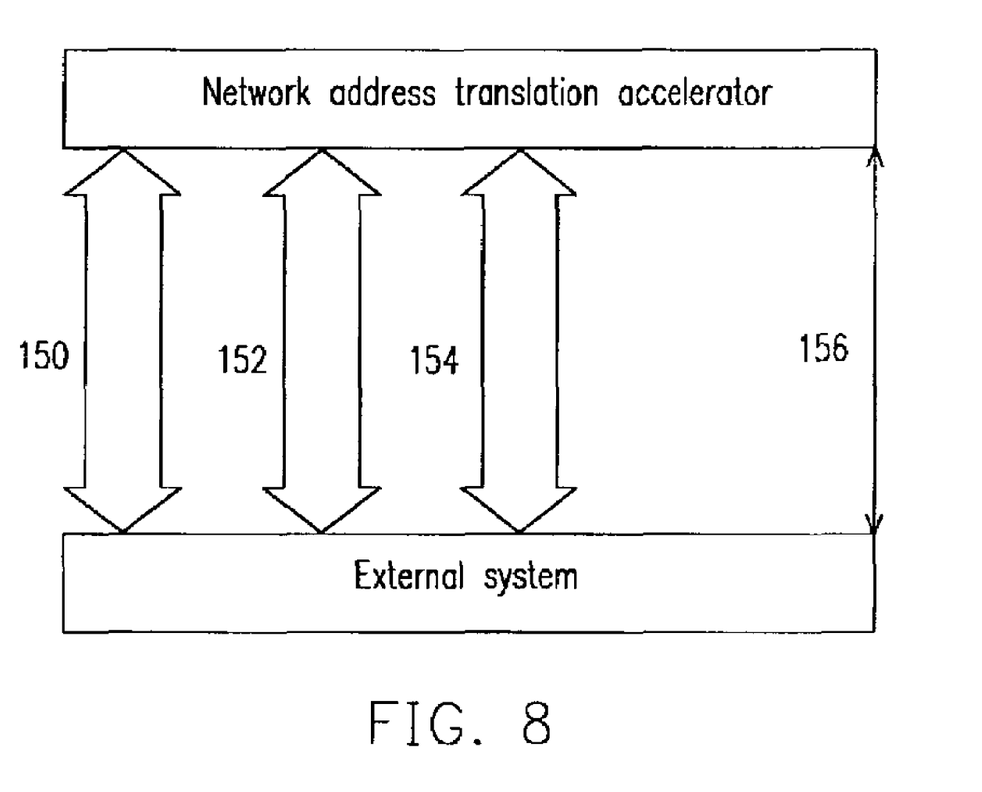
FIG. 8 schematically shows a diagram of a connection of the network address translation accelerator and the external system via the bus.

Referring to FIG. 8, the communication links for the network address translation accelerator communicating to the external system via the bus can be divided into four parts as: a connection one 150, a connection two 152, a connection three 154, and a connection four 156. The connection one 150 comprises a counter increase bit for the external system to the network address translation table of the network address translation accelerator, a counter increase entry bit of the network address translation table, and a countable value increase state that the network address translation accelerator replies to the network address translation table. The connection two 152 is a portion of the comparing engine, wherein the portion that the external system sends to the network address translation accelerator comprises a network address translation table read request, a media storing control direction bit, a network address translation table query information, a fragment bit, and a network address translation table query confirmation signal. Moreover, the network address translation accelerator replies an address of the hit network address translation table, a port of the hit network address translation table, and an inverse bit of the routing address translation table. The connection three 154 is used to replace the portion of the engine, wherein the portion transmitted from the external system to the network address translation accelerator comprises a packet replacement request, a packet replacement entry, and a packet replacement permission. The network address translation table accelerator replies a packet replacement interrupt and a packet replacement error interrupt.

Besides the elements mentioned above, the network address translation accelerator may further comprise an element to process the operations other than the network address translation, e.g., firewall, virtual server, etc. Firewall is basically used to prevent others from accessing the LAN, and further to control data access in the network. Firewall is the only channel to access the LAN; in other words, any input or output data has to go through the firewall, and the firewall determines whether to pass it or to block it, so that the network security can be improved. The virtual server provides the function of configuring a server, and it is used to assign the specific host such as the Web, Mail, and FTP type of server inside the internal LAN. The port is used to communicate with LAN and WAN for data transmitting and receiving.

In summary, the present invention discloses a network address translation accelerator. The network address translation table data of the network address translation accelerator according to the present invention only comprises the masquerading information and the private information, and the public information is not included in it when compared with the traditional network address translation table. Therefore, the area and size of the corresponding codes are reduced and the speed for processing it is improved. Moreover, the process of translating the network address translation table can be achieved by hardware, so that the processing speed is higher than in the prior art in which the software is used to process it. Furthermore, the packets can be divided into a plurality of portions and can be processed by multiple comparing engines simultaneously, so that the time needed for translating the network address is assured to be shorter than the time needed for transmitting it. Therefore, it can effectively avoid the transmission delay caused by the network address translation.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

The invention claimed is:

1. A network address translation accelerator, comprising:
   a first processor, used to process the network address translation, wherein information of a header address and port of a packet is compared with a network address translation table, so as to obtain a corresponding address and port information, and the information of the header address and port of the packet is replaced by the corresponding address and port information;
   a second processor, used to process a plurality of operations rather than the network address translation;
   a plurality of ports, used to connect the network address translation accelerator to a LAN and a WAN, so as to transmit or receive the data that is transmitted between the network address translation accelerator and the WAN and the LAN, wherein a plurality of entries inside the network address translation table are divided into a plurality of means for comparing information of the header address and port of the packet with the network address translation table;
   wherein the plurality of means for comparing information of the header address and port of the packet with the network address translation table, do not compare a port value of the packet with the network address translation table when the packet is a fragment packet.

2. The network address translation accelerator of claim 1, wherein a sequence of a private information's port inside the network address translation table mentioned above is sorted according to a destination port that is transmitted to the WAN.

3. The network address translation accelerator of claim 1, wherein the plurality of means for comparing information of the header address and port of the packet with the network address translation table, corresponds to the plurality of entries of the divided network address translation table one-on-one, and performs a query operation simultaneously.

4. The network address translation accelerator of claim 3, wherein time for querying operation is smaller than time for storing a whole packet that contains minimum data to a memory.

5. The network address translation accelerator of claim 1, further comprising at least one transmitting engine, wherein the transmitting engine has functions of deleting and adding, so that a Point-to-Point Protocol on Ethernet header of the packet can be deleted or added when it is transmitted between an Ethernet and a Point-to-Point Protocol area.

6. The network address translation accelerator of claim 1, wherein objects of the replacing operation of means for replacing the information of the header address and port of the packet with the corresponding address and port information are an address and a port.

7. A network address translation accelerator, comprising:
   a network address translation table, used to record a plurality of conversion information of the address and port;
   at least one means for comparing an information of a header address and port of a packet with a network address translation table, so as to obtain a corresponding address and port information; and
   a means for replacing the information of the header address and port of the packet with the corresponding address and port information, wherein a plurality of entries inside the network address translation table is divided into a plurality of means for comparing information of the header address and port of the packet with the network address translation table;
   wherein the plurality of means for comparing information of the header address and port of the packet with the network address translation table, do not compare a port value of the packet with the network address translation table when the packet is a fragment packet.

8. The network address translation accelerator of claim 7, wherein a sequence of a private information's port inside the network address translation table is sorted according to a destination port that is transmitted to a WAN.

9. The network address translation accelerator of claim 7, wherein the plurality of means for comparing information of the header address and port of the packet with the network address translation table, corresponds to the plurality of entries of the divided network address translation table one-on-one, and performs a query operation simultaneously.

10. The network address translation accelerator of claim 9, wherein time for the querying operation is smaller than time for storing a whole packet that contains minimum data to a memory.

11. The network address translation accelerator of claim 7, further comprising at least one transmitting engine, wherein the transmitting engine has functions of deleting and adding, so that a Point-to-Point Protocol on Ethernet header of the packet can be deleted or added when it is transmitted between an Ethernet and a Point-to-Point Protocol area.

12. The network address translation accelerator of claim 7, wherein objects of the replacing operation of the means for replacing the information of the header address and port of the packet with the corresponding address and port information are an address and a port.

13. The network address translation accelerator of claim 1, wherein the first processor mentioned above comprises:
a plurality of means for comparing information of a header address and port of a packet with a network address translation table, so as to obtain a corresponding address and port information; and
a replacing means for replacing the information of the header address and port of the packet with the corresponding address and port information.

14. The network address translation accelerator of claim 13, wherein the network address translation table comprises a masquerading information and a private information.

15. The network address translation accelerator of claim 7, wherein the network address translation table comprises a masquerading information and a private information.

* * * * *